(12) United States Patent
Lee et al.

(10) Patent No.: US 10,507,878 B2
(45) Date of Patent: Dec. 17, 2019

(54) VEHICLE BODY TRANSFER SYSTEM USING TRANSFER UNIT

(71) Applicants: HYUNDAI MOTOR COMPANY, Seoul (KR); KIA MOTORS CORPORATION, Seoul (KR)

(72) Inventors: Hyunwoo Lee, Suwon-si (KR); Ji Eun Jang, Uiwang-si (KR); Yoon Jang, Incheon (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 93 days.

(21) Appl. No.: 15/832,378

(22) Filed: Dec. 5, 2017

(65) Prior Publication Data

US 2019/0092408 A1 Mar. 28, 2019

(30) Foreign Application Priority Data

Sep. 22, 2017 (KR) .......................... 10-2017-0122515

(51) Int. Cl.
| | | |
|---|---|---|
| *B62D 65/18* | (2006.01) | |
| *B62D 65/02* | (2006.01) | |
| *B23Q 1/64* | (2006.01) | |
| *B25B 11/02* | (2006.01) | |

(52) U.S. Cl.
CPC ............ *B62D 65/026* (2013.01); *B23Q 1/64* (2013.01); *B25B 11/02* (2013.01); *B62D 65/022* (2013.01); *B62D 65/18* (2013.01); *B23P 2700/50* (2013.01)

(58) Field of Classification Search
CPC ............ B62D 65/026; Y10T 29/53365; Y10T 29/5337; Y10T 29/53383; Y10T 29/53417; Y10T 29/53548; Y10T 29/5196
See application file for complete search history.

(56) References Cited

U.S. PATENT DOCUMENTS

| | | | |
|---|---|---|---|
| 2009/0289043 A1* | 11/2009 | Kilibarda ............. | B23K 37/047 219/136 |
| 2012/0146274 A1* | 6/2012 | Kim ..................... | B62D 65/026 269/61 |
| 2013/0082169 A1* | 4/2013 | Kilibarda ............. | B62D 65/026 250/222.1 |

FOREIGN PATENT DOCUMENTS

KR  10-2012-0063777 A  6/2012

* cited by examiner

*Primary Examiner* — Jason L Vaughan
*Assistant Examiner* — Amanda Kreiling
(74) *Attorney, Agent, or Firm* — Brinks Gilson & Lione

(57) ABSTRACT

The present disclosure provides a vehicle body transfer system using a transfer unit. The system may include a base configured to move along a base rail; a moving unit comprising a supporting part that is configured to support a vehicle body, wherein the moving unit is configured to move the supporting part in a predetermined direction and the moving part is disposed on the base; and a tool unit disposed outside the base rail and selectively engaged to the moving unit, wherein the tool unit is configured to provide a driving torque such that the moving unit controls a position of the supporting part.

8 Claims, 5 Drawing Sheets

VEHICLE BODY TRANSFER SYSTEM USING TRANSFER UNIT

CROSS-REFERENCE TO RELATED APPLICATION

The present application claims priority to and the benefit of Korean Patent Application No. 10-2017-0122515, filed on Sep. 22, 2017, which is incorporated herein by reference in its entirety.

FIELD

The present disclosure relates to a vehicle body transfer system using a transfer unit for improving a production flexibility of a vehicle by transporting a vehicle body having various shapes and sizes according to vehicle types in a vehicle production line.

BACKGROUND

The statements in this section merely provide background information related to the present disclosure and may not constitute prior art.

Generally, many different parts are assembled through various processes to manufacture a vehicle.

Particularly, as the first step in a vehicle manufacturing process, a vehicle body panel is produced during a press process. Each panel is then assembled and joined to complete a vehicle body (BIW: body in white).

For the vehicle body, a side panel, a roof panel, and a rear panel, etc. are joined during a main body process. A painting work is conducted during a painting process, and then an engine, a transmission, and interior/exterior materials are assembled during an outfitting process.

Here, to move the vehicle body into different processes or to conduct a welding work, an assemble work, a sealing work, and a hemming work, etc. for the vehicle body, the vehicle body is disposed on a transfer unit and the vehicle body moves while the transfer unit moves along a transport rail.

However, a vehicle body transfer system using the conventional transfer unit is difficult to accommodate various shapes and sizes of the vehicle body. Accordingly, the conventional vehicle body transfer system used different type of transfer units corresponding to each vehicle type.

Recently, a common transfer unit capable of transporting the various vehicle bodies by varying a width direction position, a length direction position, and a height of a supporting part supporting the vehicle body has been introduced.

In this case, a motor for varying the position of the supporting part must be provided and this may increase manufacturing cost associated with manufacturing the transfer unit may be increased and, as a result, a maintenance may also be burdensome.

As the needs of consumers become diverse, a number of production demand models (platforms) is also increasing due to the diverse vehicle types (the engine, a fuel cell, an electric vehicle, etc.).

In a situation where the global economy is uncertain, auto manufacturers around the world are inevitable to increase the vehicle types with the same production line rather than constructing a new factory. In that regard, sharing (common use) for the transfer unit may be desired.

The above information disclosed in this section is only for enhancement of understanding of the background of the disclosure and therefore it may contain information that does not form the prior art that is already known in this country to a person of ordinary skill in the art.

SUMMARY

The present disclosure provides a vehicle body transfer system using a transfer unit by configuring the position of the supporting part to be variable in the transfer unit, thereby applying one transfer unit to the various vehicle body to reduce the transfer unit production cost. Also, removing the motor from the transfer unit may help to reduce the cost and a weight.

A vehicle body transfer system using a transfer unit in one form of the present disclosure includes a base configured to move along a base rail; a moving unit including a supporting part that is configured to support a vehicle body, wherein the moving unit is configured to move the supporting part in a predetermined direction and the moving part is disposed on the base; and a tool unit disposed outside the base rail and selectively engaged to the moving unit, wherein the tool unit is configured to provide a driving torque such that the moving unit controls a position of the supporting part.

The supporting part may include a supporting pin extending upward.

The supporting part may be a supporting member that is configured to support a lower part of the vehicle body.

The moving unit may include a first rail formed in a first direction on the base; and a first moving member disposed on the first rail.

The moving unit may further include a first tool combination part configured to move the first moving member along the first rail.

The tool unit may include a first tool unit including a first tool selectively coupled to the first tool combination part and a first motor configured to rotate the first tool.

The tool unit may further include a first actuator configured to push the first tool unit such that the first tool is coupled to the first tool combination part, or to pull the first tool unit such that the first tool is separated from the first tool combination part.

The first actuator may include a pneumatic or hydraulic cylinder.

The moving unit may further include a first rail formed in the first direction on the base; a first moving member disposed on the first rail; a second rail formed in the second direction on the first moving member; a second moving member disposed on the second rail; a third rail formed in a third direction on the second moving member; and a third moving member disposed on the third rail, and the supporting part may be disposed on the third moving member.

The moving unit may include a first tool combination part configured to move the first moving member along the first rail; a second tool combination part configured to move the second moving member along the second rail; and a third tool combination part configured to move the third moving member along the third rail.

The tool unit may include a first tool unit including a first tool selectively coupled to the first tool combination part and a first motor configured to rotate the first tool; a second tool unit including a second tool selectively coupled to the second tool combination part and a second motor configured to rotate the second tool; and a third tool unit including a third tool selectively coupled to the third tool combination part and a third motor configured to rotate the third tool.

The tool unit may include a first actuator configured to push the first tool unit such that the first tool is coupled to the first tool combination part or to pull the first tool unit such that the first tool is separated from the first tool combination part; a second actuator configured to push the second tool unit such that the second tool is coupled to the second tool combination part or to pull the second tool unit such that the second tool is separated from the second tool combination part; and a third actuator configured to push the third tool unit such that the third tool is coupled to the third tool combination part or to pull the third tool unit such that the third tool is separated from the third tool combination part.

A camera disposed at an upper side of the base and configured to show the moving unit and the tool unit, and to sense positions of the moving unit and the tool unit may be further included.

A controller configured to control a position of the base on the base rail based on a camera signal such that the tool unit corresponds to the moving unit, and move the supporting part to a predetermined position by selectively engaging the first tool to the first tool combination part, selectively engaging the second tool to the second tool combination part, and selectively engaging the third tool to the third tool combination part may be further included.

The controller may be configured to receive a vehicle body information and to control the position of the supporting part based on the vehicle body information.

The moving unit may be formed at a predetermined position on the base, the supporting part may be formed on the moving unit, and the tool unit may be formed outside the base corresponding to the moving unit.

Accordingly, in some forms of the present disclosure, in the transfer unit, as the tool unit varying the position of the supporting part which supports the vehicle body is disposed outside, the weight and the production cost of the transfer unit may be reduced.

Also, it may be no longer desired to provide each tool unit on the transfer unit such that the cost of the entire system may be reduced.

Moreover, as the position of the supporting part provided at the various transfer units may be varied by using one tool unit, the toll unit may adopt to the various vehicle bodies.

Furthermore, by diversifying the types of the vehicle body produced at one factory, a vehicle productivity may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
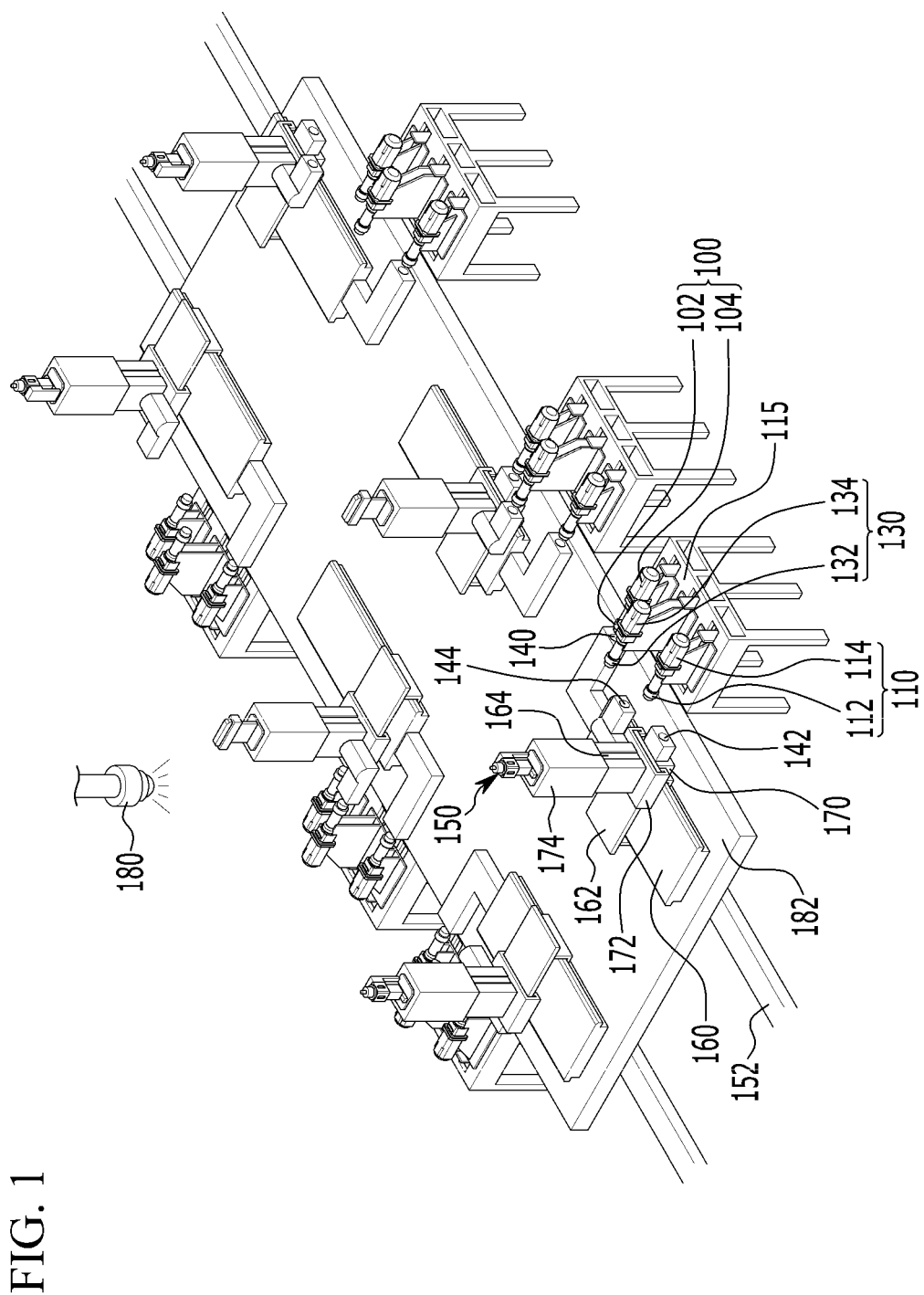
FIG. 1 is a perspective view of a vehicle body transfer system using a transfer unit.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the accompanying drawings.

However, the size and thickness of each component illustrated in the drawings are arbitrarily shown for ease of description and the present disclosure is not limited thereto, and the thicknesses of portions and regions are exaggerated for clarity.

In addition, parts that are irrelevant to the description are omitted to clearly describe the exemplary forms of the present disclosure, and like reference numerals designate like elements throughout the specification, which also applies to the related art.

In the following description, dividing names of components into first, second, and the like is to divide the names because the names of the components are the same as each other, and an order thereof is not particularly limited.

Figure 2:
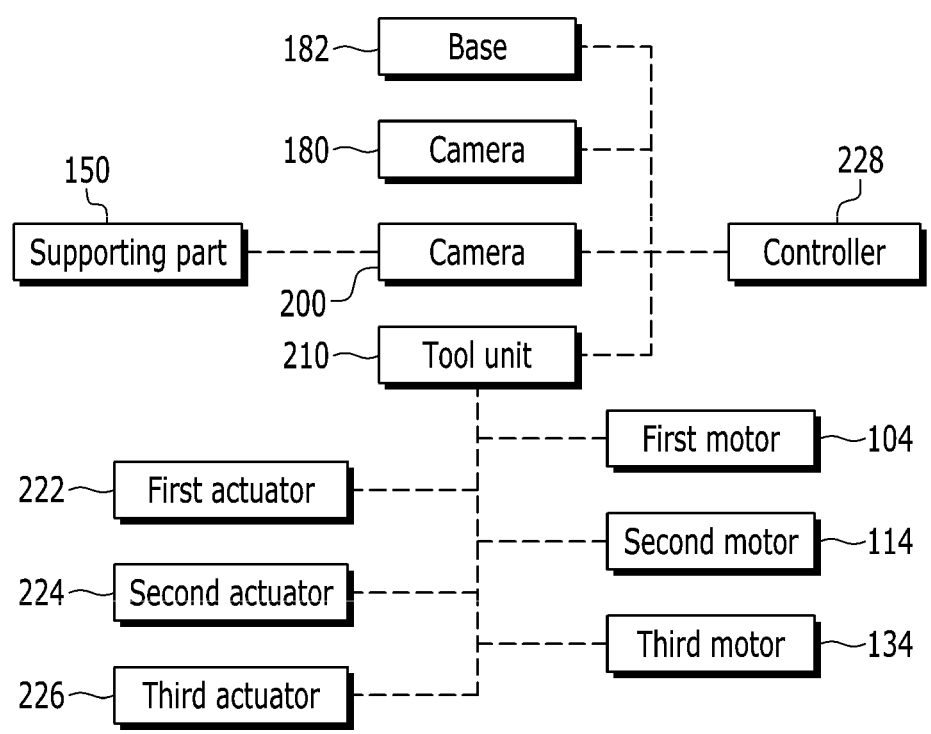
FIG. 2 is a schematic diagram of a vehicle body transfer system using a transfer unit.

FIG. 1 is a perspective view of a vehicle body transfer system using a transfer unit in some forms of the present disclosure, and FIG. 2 is a schematic diagram of a vehicle body transfer system using a transfer unit in some forms of the present disclosure.

Referring to FIGS. 1 and 2, a base 182 is disposed on a base rail 152. Also, a supporting part 150 to support a lower part of a vehicle body (not shown) is disposed on the base 182. Here, the supporting part 150 is disposed at a predetermined position and a supporting member stably supporting the lower part of the vehicle body.

The position of the supporting part 150 may be controlled by the moving unit 200, and the supporting part 150 includes a supporting pin 151 extending upward so as to be inserted to a hole formed at the lower part of the vehicle body.

The moving unit 200 includes a first tool combination part 140, a second tool combination part 142, a third tool combination part 144, a first rail 160, a second rail 162, third rail 164, a first moving member 170, a second moving member 172, and a third moving member 174, and the supporting part 150 is disposed on the third moving member 174.

In detail, the first rail 160 is disposed on the base 182 in a back and forth direction, and the first moving member 170 is disposed to be movable in the back and forth direction on the first rail 160.

Also, the second rail 162 is disposed at the first moving member 170 in a width direction, and the second moving member 172 is disposed to be movable in the width direction on the second rail 162.

Also, the third rail 164 is disposed at the second moving member 172 in the up and down direction, and the third moving member 174 is disposed to be movable on the third rail 164 in the up and down direction.

The first tool combination part 140 is connected to the first moving member 170, the second tool combination part 142 is connected to the second moving member 172, and the third tool combination part 144 is connected to the third moving member 174.

A tool unit 210 is disposed corresponding to the moving unit 200 outside the base 182.

The tool unit 210 includes a first tool 102, a second tool 112, a third tool 132, a first motor 104, a second motor 114, a third motor 134, and a tool frame 115 shown in FIG. 1. Also, the tool unit 210 includes a first actuator 222, a second actuator 224, and a third actuator 226.

The first tool 102 may be selectively engaged to the first tool combination part 140, the second tool 112 may be selectively engaged to the second tool combination part 142, and the third tool 132 may be selectively engaged to the third tool combination part 144.

The first motor 104 is disposed to rotate the first tool 102, the second motor 114 is disposed to rotate the second tool 112, and the third motor 134 is disposed to rotate the third tool 132.

For convenience of understanding, the first motor 104 and the first tool 102 are referred to as a first tool unit 100, the second motor 114 and the second tool 112 are referred to as a second tool unit 110, and the third motor 134 and the third tool 132 are referred to as a third tool unit 130.

The first actuator 222 is disposed to push or pull the first tool unit 100, the second actuator 224 is disposed to push or pull the second tool unit 110, and the third actuator 226 is disposed to push or pull the third tool unit 130. Each of the actuators 222, 224, and 226 may include a pneumatic or hydraulic cylinder.

A camera 180 is disposed at an upper side of the supporting part 150 at the base 182, and the camera 180 may sense positions of the moving unit 200, the tool unit 210, and the supporting part 150.

The controller 228 may move the base 182 on the base rail 152 through a base moving motor (not shown).

Also, the controller 228 controls the operation of the moving unit 200 through the tool unit 210, thereby controlling each position of the back and forth direction, the width direction, and the up and down direction of the supporting part 150.

The camera 180 shoots the position of the supporting part 150 and the position of the moving unit 200 and the tool unit 210.

Also, the controller 228 may control the position of the base 182 and the position of the supporting part 150 by using a data shoot from the camera 180, and match the first, second, and third tool combination parts 140, 142, and 144 and the first, second, and third tools 102, 112, and 132 to each other.

The controller 228 may be implemented as at least one microprocessor operated by a predetermined program, and the predetermined program may include a series of commands to perform a method in some forms of the present disclosure.

Figure 3:
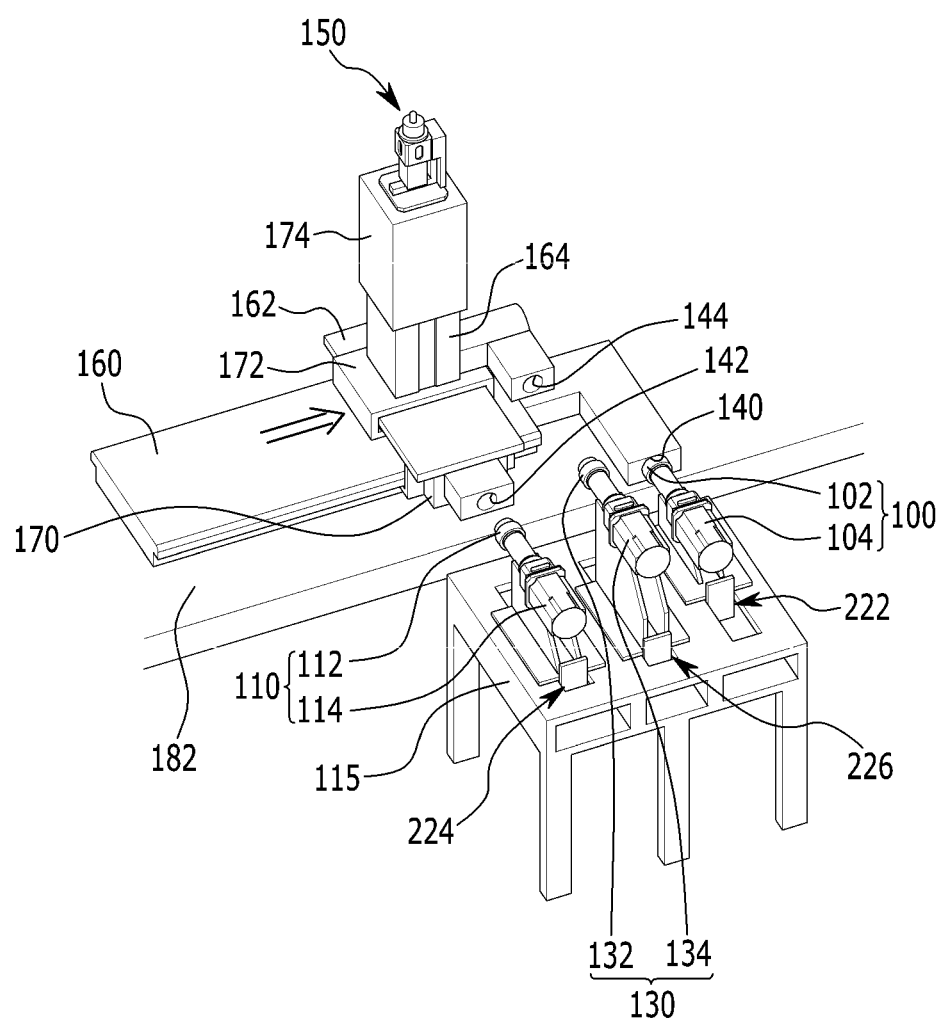
FIG. 3 is a partial perspective view showing a state controlling a length direction position of a supporting part in a vehicle body transfer system using a transfer unit.

FIG. 3 is a partial perspective view showing a state controlling a length direction position of a supporting part in a vehicle body transfer system using a transfer unit in some forms of the present disclosure.

Referring to FIG. 3, the base 182 is fixed at a predetermined position on the base rail 152, and the first actuator 222 pushes the first tool unit 100 in a front direction. Accordingly, the first tool 102 of the first tool unit 100 is engaged to the first tool combination part 140.

Here, the first motor 104 rotates the first tool 102, and the first moving member 170 moves the predetermined position on the first rail 160 through the first tool combination part 140.

The first tool combination part 140 is connected to the first moving member 170 by a gear, an operation rod, etc. and the first moving member 170 moves on the first rail 160 by the rotation of the first tool combination part 140.

Since a configuration for moving members on the rail via a rotational motion is obvious to ordinary technicians in the technical field to which the transfer unit belongs, a detailed explanation will be omitted.

In some forms of the present disclosure, the first tool 102 may maintain a state that is combined to the first tool combination part 140 after controlling the position of the first moving member 170. Also, the first tool 102 may be separated from the first tool combination part 140 after controlling the position of the first moving member 170.

Figure 4:
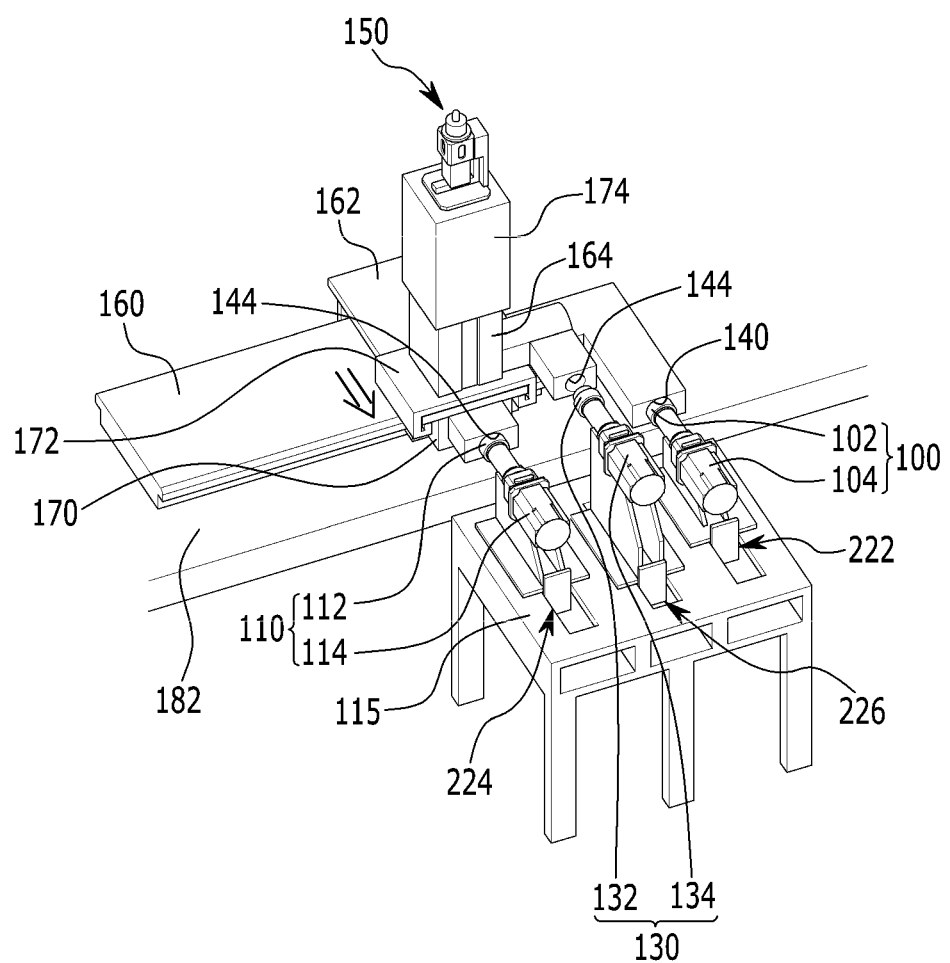
FIG. 4 is a partial perspective view showing a state controlling a width direction position of a supporting part in a vehicle body transfer system using a transfer unit.

FIG. 4 is a partial perspective view showing a state controlling a width direction position of a supporting part in a vehicle body transfer system using a transfer unit in some forms of the present disclosure.

Referring to FIG. 4, in the state that the base 182 is fixed at the predetermined position on the base rail 152, the second actuator 224 pushes the second tool unit 110 in the front direction. Accordingly, the second tool 112 of the second tool unit 110 is engaged to the second tool combination part 142.

Here, the second motor 114 rotates the second tool 112, and the second moving member 172 moves to the predetermined position on the second rail 162 through the second tool combination part 142.

The second tool combination part 142 is connected to the second moving member 172 by the gear, the operation rod, etc., and the second moving member 172 moves on the second rail 162 by the rotation of the second tool combination part 142.

Since a configuration for moving members on the rail via a rotational motion is obvious to ordinary technicians in the technical field to which the transfer unit belongs, a detailed explanation will be omitted.

In some forms of the present disclosure, the second tool 112 may maintain the state that is combined to the second tool combination part 142 after controlling the position of the second moving member 172. Also, the second tool 112 may be separated from the second tool combination part 142 after controlling the position of the second moving member 172.

Figure 5:
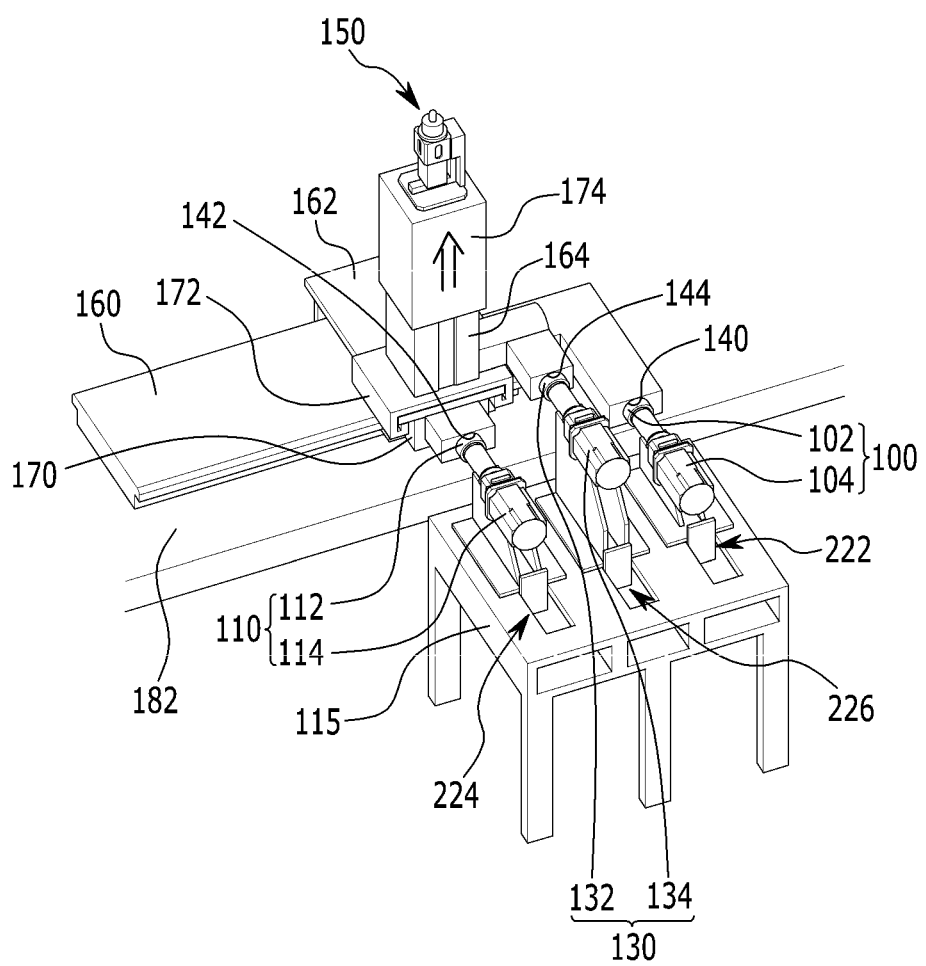
FIG. 5 is a partial perspective view showing a state controlling an up and down direction position of a supporting part in a vehicle body transfer system using a transfer unit.

FIG. 5 is a partial perspective view showing a state controlling an up and down direction position of a supporting part in a vehicle body transfer system using a transfer unit in some forms of the present disclosure.

Referring to FIG. 5, in the state that the base 182 is fixed at the predetermined position on the base rail 152, the third actuator 226 pushes the third tool unit 130 in the front direction. Accordingly, the third tool 132 of the third tool unit 130 is engaged to the third tool combination part 144.

Here, the third motor 134 rotates the third tool 132, and the third moving member 174 moves to the predetermined position on the third rail 164 through the third tool combination part 144.

The third tool combination part 144 is connected to the third moving member 1724 by the gear, the operation rod, etc., and the third moving member 174 moves on the third rail 164 by the rotation of the third tool combination part 144.

Since a configuration for moving members on the rail via a rotational motion is obvious to ordinary technicians in the technical field to which the transfer unit belongs in some forms of the present disclosure, a detailed explanation will be omitted.

In some forms of the present disclosure, after the third tool 132 controls the position of the third moving member 174, the state that is combined to third tool combination part 144 may be maintained. Also, the third tool 132 may be separated from the third tool combination part 144 after controlling the position of the third moving member 174.

In some forms of the present disclosure, the order in which the first, second, and third tools 102, 112, and 132 are combined to the first, second, and third tool combination parts 140, 142, and 144 may be selected according to the position of the supporting part 150, and at least one selected from the first, second, and third tools 102, 112, and 132 may be engaged to the first, second, and third tool combination parts 140, 142, and 144.

The description of the disclosure is merely exemplary in nature and, thus, variations that do not depart from the substance of the disclosure are intended to be within the scope of the disclosure. Such variations are not to be regarded as a departure from the spirit and scope of the disclosure.

DESCRIPTION OF SYMBOLS

100: first tool unit 102: first tool
104: first motor 110: second tool unit
112: second tool 114: second motor
115: tool frame 130: third tool unit
132: third tool 134: third motor
140: first tool combination part 142: second tool combination part
144: third tool combination part 150: supporting part
152: base rail 160: first rail
162: second rail 164: third rail
170: first moving member 172: second moving member
174: third moving member 180: camera
182: base 200: moving unit
210: tool unit 222: first actuator
224: second actuator 226: third actuator
228: controller

What is claimed is:

1. A vehicle body transfer system using a transfer unit, the system comprising:
    a base configured to move along a base rail;
    a moving unit comprising a supporting part that is configured to support a vehicle body, wherein the moving unit is configured to move the supporting part in a predetermined direction and the moving unit is disposed on the base; and
    a tool unit disposed outside the base rail and selectively engaged to the moving unit, wherein the tool unit is configured to provide a driving torque such that the moving unit controls a position of the supporting part,
    wherein the moving unit comprises:
        a first rail formed on the base in a first direction;
        a first moving member disposed on the first rail; and
        a first tool combination part configured to move the first moving member along the first rail, and
    wherein the tool unit comprises:
        a first tool unit comprising:
            a first tool selectively coupled to the first tool combination part; and
            a first motor configured to rotate the first tool; and
            a first actuator configured to push the first tool unit such that the first tool is coupled to the first tool combination part, or to pull the first tool unit such that the first tool is separated from the first tool combination part.

2. The vehicle body transfer system of claim 1, wherein the supporting part comprises:
    a supporting pin extending upward.

3. The vehicle body transfer system of claim 1, wherein:
    the supporting part is a supporting member that is configured to support a lower part of the vehicle body.

4. The vehicle body transfer system of claim 1, wherein the first actuator comprises:
    a pneumatic cylinder or a hydraulic cylinder.

5. The vehicle body transfer system of claim 1,
    wherein the moving unit is formed at a predetermined position on the base,
    wherein the supporting part is formed on the moving unit, and
    wherein the tool unit is formed outside the base corresponding to the moving unit.

6. A vehicle body transfer system using a transfer unit, the system comprising:
    a base configured to move along a base rail;
    a moving unit comprising a supporting part that is configured to support a vehicle body, wherein the moving unit is configured to move the supporting part in a predetermined direction and the moving unit is disposed on the base; and
    a tool unit disposed outside the base rail and selectively engaged to the moving unit, wherein the tool unit is configured to provide a driving torque such that the moving unit controls a position of the supporting part,
    wherein the moving unit comprises:
        a first rail formed on the base in the first direction;
        a first moving member disposed on the first rail;
        a second rail formed on the first moving member in a second direction;
        a second moving member disposed on the second rail;
        a third rail formed on the second moving member in a third direction;
        a third moving member disposed on the third rail, wherein the supporting part is disposed on the third moving member;
        a first tool combination part configured to move the first moving member along the first rail;
        a second tool combination part configured to move the second moving member along the second rail; and
        a third tool combination part configured to move the third moving member along the third rail, and
    wherein the tool unit comprises:
        a first tool unit comprising:
            a first tool selectively coupled to the first tool combination part; and
            a first motor configured to rotate the first tool;
        a second tool unit comprising:
            a second tool selectively coupled to the second tool combination part; and
            a second motor configured to rotate the second tool;
        a third tool unit comprising:
            a third tool selectively coupled to the third tool combination part; and
            a third motor configured to rotate the third tool;
        a first actuator configured to push the first tool unit such that the first tool is coupled to the first tool combination part, or to pull the first tool unit such that the first tool is separated from the first tool combination part;

a second actuator configured to push the second tool unit such that the second tool is coupled to the second tool combination part, or to pull the second tool unit such that the second tool is separated from the second tool combination part; and a third actuator configured to push the third tool unit such that the third tool is coupled to the third tool combination part, or to pull the third tool unit such that the third tool is separated from the third tool combination part.

7. A vehicle body transfer system using a transfer unit, the system comprising:

a base configured to move along a base rail;

a moving unit comprising a supporting part that is configured to support a vehicle body, wherein the moving unit is configured to move the supporting part in a predetermined direction and the moving unit is disposed on the base;

a tool unit disposed outside the base rail and selectively engaged to the moving unit, wherein the tool unit is configured to provide a driving torque such that the moving unit controls a position of the supporting part;

a camera configured to:
    show the moving unit and the tool unit; and
    sense positions of the moving unit and the tool unit, wherein the camera is disposed on an upper side of the base; and a controller configured to:
    control a position of the base on the base rail based on a camera signal such that the tool unit corresponds to the moving unit; and
    move the supporting part to a predetermined position by:
        selectively engaging the first tool to the first tool combination part;
        selectively engaging the second tool to the second tool combination part; and
        selectively engaging the third tool to the third tool combination part.

8. The vehicle body transfer system of claim 7, wherein:
the controller is configured to receive a vehicle body information and to control the position of the supporting part based on the vehicle body information.

* * * * *